United States Patent
Klink et al.

(10) Patent No.: US 11,228,453 B2
(45) Date of Patent: Jan. 18, 2022

(54) SECURE PROVISIONING OF ELECTRONIC LOCK CONTROLLERS

(71) Applicant: SERA4 LTD., Waterloo (CA)

(72) Inventors: Jerod D. Klink, Kitchener (CA); Konrad Hammel, Dundas (CA); Denis Margine, Kitchener (CA)

(73) Assignee: SERA4 LTD., Waterloo (CA)

( * ) Notice: Subject to any disclaimer, the term of this patent is extended or adjusted under 35 U.S.C. 154(b) by 238 days.

(21) Appl. No.: 16/703,731

(22) Filed: Dec. 4, 2019

(65) Prior Publication Data

US 2020/0186366 A1 Jun. 11, 2020

Related U.S. Application Data

(60) Provisional application No. 62/775,429, filed on Dec. 5, 2018.

(51) Int. Cl.
| | |
|---|---|
| *H04L 9/32* | (2006.01) |
| *H04L 9/08* | (2006.01) |
| *H04W 12/04* | (2021.01) |
| *G06K 19/06* | (2006.01) |
| *G07C 9/28* | (2020.01) |
| *H04W 12/041* | (2021.01) |
| *G06F 7/58* | (2006.01) |

(52) U.S. Cl.
CPC ...... *H04L 9/3268* (2013.01); *G06K 19/06037* (2013.01); *G07C 9/28* (2020.01); *H04L 9/0869* (2013.01); *H04L 9/3247* (2013.01); *H04W 12/041* (2021.01); *G06F 7/588* (2013.01)

(58) Field of Classification Search
CPC ... H04L 9/3268; H04L 9/0869; H04L 9/3247; G07C 9/28; H04W 12/041; G06K 19/06037; G06F 7/588
See application file for complete search history.

(56) References Cited

U.S. PATENT DOCUMENTS

| | | | | |
|---|---|---|---|---|
| 10,057,243 | B1 * | 8/2018 | Kumar | H04L 9/0637 |
| 10,149,159 | B1 * | 12/2018 | Perfitt | H04W 12/069 |
| 2005/0138386 | A1 * | 6/2005 | Saint | H04L 63/12 |
| | | | | 713/185 |
| 2013/0247218 | A1 | 9/2013 | Jhingan et al. | |

(Continued)

OTHER PUBLICATIONS

QRYPTAL; "The Simpler Approach to Secure and Verify Documents"; https://www.qryptal.com/landingpages/signed-qr-code/; Dec. 2, 2019.

*Primary Examiner* — Catherine Thiaw
(74) *Attorney, Agent, or Firm* — Perry + Currier Inc.

(57) ABSTRACT

Devices, systems, and methods for preparing an electronic lock controller to obtain a digital certificate that verifies authenticity of the electronic lock controller are provided. The method involves physically marking an electronic lock controller with a mark containing digitally signed lock information. The digitally signed lock information includes a hardware identifier, and is digitally signed at a server using a private key of the server. The method further involves loading the electronic lock controller with self-provisioning instructions to cause the electronic lock controller to obtain a digital certificate that includes the public key of the electronic lock controller and the hardware identifier, the digital certificate having been signed by a private key of the server.

20 Claims, 6 Drawing Sheets

(56) References Cited

U.S. PATENT DOCUMENTS

| | | | | |
|---|---|---|---|---|
| 2015/0089232 A1* | 3/2015 | Belton | ............... | H04L 63/0823 |
| | | | | 713/175 |
| 2015/0195394 A1* | 7/2015 | Bietz | ................ | H04M 1/72412 |
| | | | | 455/419 |
| 2016/0294829 A1* | 10/2016 | Angus | ..................... | H04L 9/085 |
| 2017/0272316 A1* | 9/2017 | Johnson | .............. | G06Q 10/103 |
| 2019/0074980 A1* | 3/2019 | Loreskar | ................ | G06F 21/57 |
| 2019/0253243 A1* | 8/2019 | Zimmerman | ........ | H04L 9/3247 |
| 2019/0327098 A1* | 10/2019 | Hart | .................. | G07C 9/00571 |

\* cited by examiner

SECURE PROVISIONING OF ELECTRONIC LOCK CONTROLLERS

FIELD

The present invention relates to security locks, and in particular, to electronic lock controllers.

BACKGROUND

Electronic lock controllers may be used to provide secure access to physical resources. An electronic lock controller is typically coupled to a physical lock that the electronic lock controller may actuate to lock, or unlock, upon receipt of a valid request. Such an electronic lock controller may receive such requests from an external device through an encrypted communication channel and may validate such requests using cryptographic keys.

SUMMARY

According to an aspect of the disclosure, a method for preparing an electronic lock controller to obtain a digital certificate that verifies authenticity of the electronic lock controller is provided. Such a method may be performed at a manufacturing facility of the electronic lock controller or by a downstream actor in the distribution chain, such as by a field technician upon installation of the electronic lock controller. The method involves physically marking an electronic lock controller with a mark containing digitally signed lock information, the digitally signed lock information including a hardware identifier, the digitally signed lock information having been digitally signed at a server using a private key of the server. The method further involves loading the electronic lock controller with non-transitory machine-readable instructions to cause a processor of the electronic lock controller to generate a private key of the electronic lock controller and a corresponding public key of the electronic lock controller, and advertise itself as being in an unprovisioned state capable of being discovered by a mobile device in a vicinity of the electronic lock controller. In response to being discovered in the unprovisioned state by the mobile device, the instructions cause the processor of the electronic lock controller to communicate with the mobile device to obtain a digital certificate, the digital certificate including the public key of the electronic lock controller and the hardware identifier, the hardware identifier having been obtained by the mobile device from the mark containing the digitally signed lock information, the digital certificate having been signed by a private key of the server.

According to another aspect of the disclosure, a method for generating a digital certificate that verifies authenticity of an electronic lock controller is provided. Such a method may be performed by a server or other computing device that facilitates access to the electronic lock controller. The method involves receiving a public key of an electronic lock controller from a mobile device and receiving digitally signed lock information from the mobile device, the digitally signed lock information having been physically marked on the electronic lock controller, the digitally signed lock information including a hardware identifier, the digitally signed lock information having been digitally signed at a server using a private key of the server. The method further involves determining whether the hardware identifier has been previously assigned and validating the digitally signed lock information using a public key of the server. The method further involves, upon determining that the hardware identifier has not previously been assigned, and upon validation of the digitally signed lock information, generating a digital certificate using the private key of the server, the digital certificate including the public key of the electronic lock controller and the hardware identifier as included in the digitally signed lock information, the digital certificate signed by the private key of the server. The method further involves logging the hardware identifier as having been assigned to the electronic lock controller and transmitting the digital certificate to the mobile device for transmission to the electronic lock controller. One or more of the steps of the method may be embodied in instructions stored on a non-transitory machine-readable storage medium executable by a processor of a computing device to execute the method.

According to yet another aspect of the disclosure, a method for obtaining for an electronic lock controller a digital certificate that verifies authenticity of the electronic lock controller is provided. The method may be performed by a processor of the electronic lock controller. The method involves determining whether an electronic lock controller is provisioned with a private key of the electronic lock controller and a corresponding public key of the electronic lock controller. The method further involves, upon determining that the electronic lock controller is not provisioned with the private key of the electronic lock controller or the corresponding public key of the electronic lock controller, generating a private key of the electronic lock controller and a corresponding public key of the electronic lock controller, and advertising that the electronic lock controller is in an unprovisioned state discoverable by a mobile device in a vicinity in the electronic lock controller. The method further involves, in response to being discovered in the unprovisioned state by the mobile device, communicating with the mobile device to obtain a digital certificate, the digital certificate including the public key of the electronic lock controller and a hardware identifier, the hardware identifier having been obtained by the mobile device from a mark containing digitally signed lock information physically marked on the electronic lock controller, the digital certificate having been signed by a private key of a server. One or more of the steps of the method may be embodied in instructions stored on a non-transitory machine-readable storage medium executable by a processor of a computing device to execute the method.

According to yet another aspect of the disclosure, a method for facilitating an electronic lock controller to obtain digital certificate that verifies authenticity of the electronic lock controller is provided. The method may be performed by a mobile device that facilitates access to the electronic lock controller. The method involves discovering an electronic lock controller advertising itself in unprovisioned state, the electronic lock controller in a vicinity of a mobile device, the electronic lock controller having a public key and a corresponding private key generated by the electronic lock controller, the electronic lock controller physically marked with a mark containing digitally signed lock information, the digitally signed lock information including a hardware identifier for the electronic lock controller, the digitally signed lock information having been digitally signed at a server using a private key of the server. The method further involves obtaining the public key of the electronic lock controller from the electronic lock controller and obtaining the digitally signed lock information from the mark, the digitally signed lock information including a hardware identifier. The method further involves communicating with the electronic lock controller to provide the electronic lock controller with a digital certificate, the digital certificate including the public key of the electronic lock controller and the hardware identifier, the digital certificate having been signed by a private key of a server. One or more of the steps of the method may be embodied in instructions stored on a non-transitory machine-readable storage medium executable by a processor of a computing device to execute the method.

DETAILED DESCRIPTION

An electronic lock controller may be provided with cryptographic keys which are to be used to handle requests for access to a physical resource that the electronic lock controller restricts. In some cases, these cryptographic keys may be provided directly by the manufacturing facility at which the electronic lock controller was manufactured.

Having the cryptographic keys of an electronic lock controller provided directly by its manufacturing facility raises concerns. First, there is the security concern that unauthorized access to the cryptographic keys may be obtained by malicious actors by breaching the security of the manufacturing facility, thereby undermining the integrity of the electronic lock controller itself. Second, there is the security concern that the manufacturing facility may use the same set of cryptographic keys for more than one electronic lock controller. Third, there is the practical concern that it may be time consuming and error-prone to attempt to ensure that each electronic lock controller produced by the manufacturing facility is assigned a unique hardware identifier and a unique set of cryptographic keys.

The present disclosure provides for the preparation of an electronic lock controller that obtains a digital certificate that verifies authenticity of the electronic lock controller without involvement of the manufacturing facility of the electronic lock controller. The manufacturing facility manufactures the electronic lock controller, marks the electronic lock controller with digitally signed lock information, including a hardware identifier, and loads the electronic lock controller with instructions to obtain such a digital certificate. The electronic lock controller then obtains the digital certificate from a trusted server. In some examples, communication between the electronic lock controller and the trusted server may facilitated by a mobile device in the vicinity of the electronic lock controller. In other examples, the electronic lock controller may obtain the digital certificate from direct communication with the trusted server.

The trusted server can thereby ensure that no third party has access to the cryptographic keys of the electronic lock controller, that the electronic lock controller is provided with a unique set of cryptographic keys, and the electronic lock controller is uniquely identified with a hardware identifier. Thus, incidents of mistakenly provisioned electronic lock controllers may be reduced, and integrity in the authenticity of the electronic lock controllers may be increased.

Figure 1:
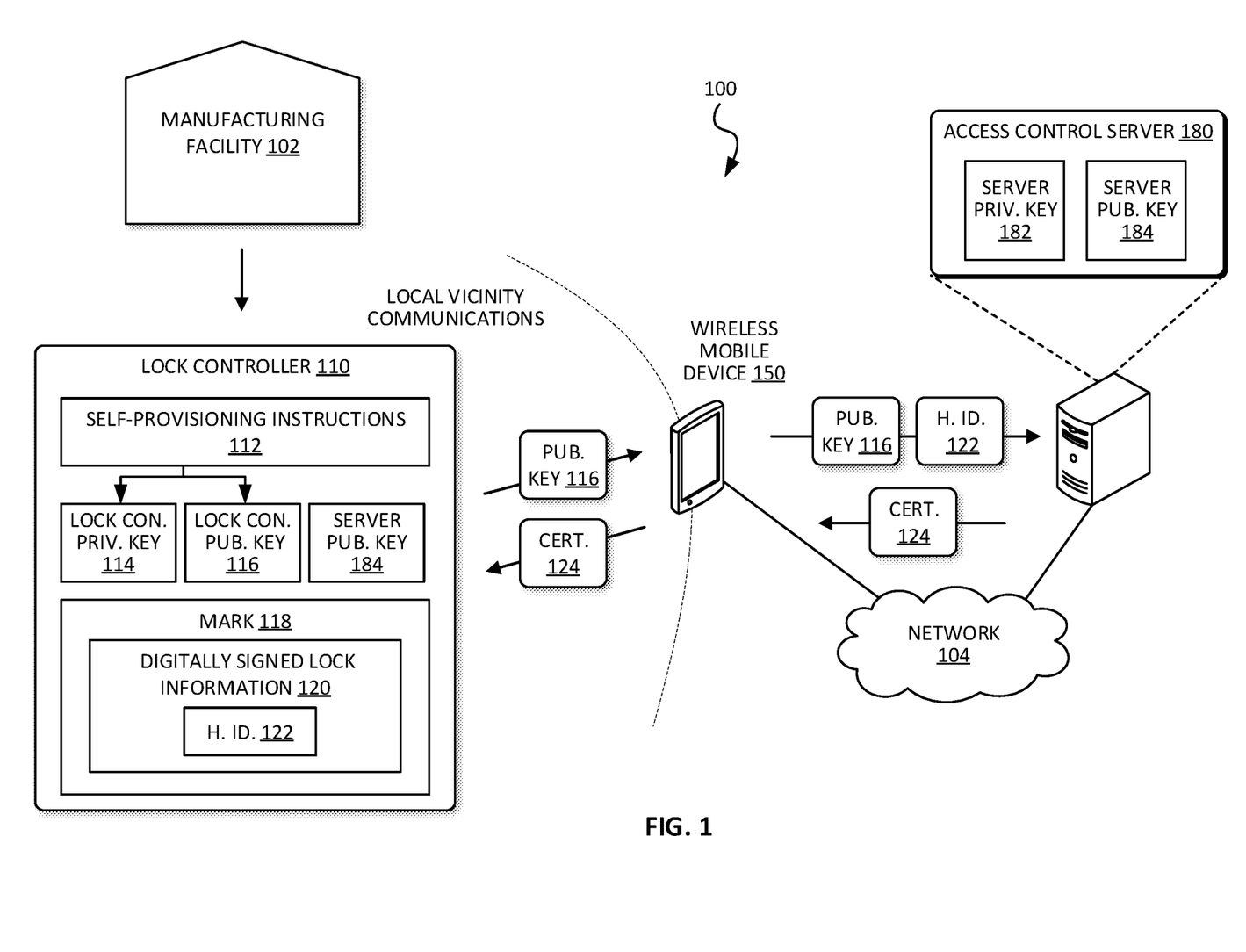
FIG. 1 is a schematic diagram of an example system with an electronic lock controller that obtains a digital certificate that verifies authenticity of the electronic lock controller.

FIG. 1 is a schematic diagram of an example system 100. The system 100 includes a manufacturing facility 102 that manufactures an electronic lock controller 110. The electronic lock controller 110 is to control access to a physical resource, and thus the electronic lock controller 110 may be manufactured to be operably connectable to an electronic actuator of a physical lock that restricts access to a physical resource.

After the electronic lock controller 110 is manufactured, and prior to the electronic lock controller 110 being put into use, the manufacturing facility 102, or another downstream actor, such as by an actor upon installation of the electronic lock controller 110, prepares the electronic lock controller 110 to obtain a digital certificate 124 that verifies authenticity of the electronic lock controller 110 without the manufacturing facility 102 providing the electronic lock controller 110 with any cryptographic keys. To obtain the digital certificate 124, the electronic lock controller 110 cooperates with a mobile device 150 and a lock access server 180 as described herein, which communicate over one or more computing networks shown as network 104.

The manufacturing facility 102 prepares the electronic lock controller 110 in this way by first physically marking the electronic lock controller 110 with a mark 118 that contains digitally signed lock information 120. The mark 118 may be a QR code or other scannable symbol that encodes the digitally signed lock information 120. The mark 118 may be on a sticker adhered to the electronic lock controller 110, or on another marking substrate fixed to the electronic lock controller 110. The digitally signed lock information 120 may comprise a uniform resource locator (URL) that contains the hardware identifier 122 embedded in the URL. For example, an example QR code may be generated with the following information: http://www.trustedwebsite.com/hwid?v=1&p=A351B070356F427052B791FF87290BDD9B5088AFD6F2655F60C4F70EE26846BD73666EC38F3F96382AED1CA62819F6DF&i=2, where "v=" is followed by a version code, "p=" is followed by the digitally signed lock information 120 containing the hardware identifier 122, and "i=" is followed by the hardware identifier 122 expressed in decimal notation. The hardware identifier 122 is embedded in the digitally signed lock information 120 for verification purposes, whereas the hardware identifier 122 may be expressed in plain text (e.g. in decimal notation here) for low-security purposes, such as inventory tracking, where verification of the hardware identifier 122 is not necessary.

The digitally signed lock information 120 was signed using a private key 182 of the access control server 180, and includes at least a hardware identifier 122 to serve as a unique identifier for the electronic lock controller 110, along with other optional information, such as a type of lock describing the electronic lock controller 110, a version code, or other information. The server 180 is trusted to provision the electronic lock controller 110 with a unique digital certificate 124 and a unique hardware identifier 122.

The manufacturing facility 102 further prepares the electronic lock controller 110 by loading the electronic lock controller 110 with self-provisioning instructions 112, which may be embodied in a software application or other non-transitory machine-readable instructions. The self-provisioning instructions 112 cause the electronic lock controller 110 to determine whether it is lacking a public/private keypair and that is in an unprovisioned state (i.e. without a digital certificate 124), which may be the case when, for example, the electronic lock controller 110 is first booted up. When these conditions are recognized, the self-provisioning instructions 112 cause the electronic lock controller 110 to generate a private key 114 and a corresponding public key 116 and to begin advertising itself as being in an unprovisioned state. The private key 114 and public key 116 may be generated at the electronic lock controller 110 using a hardware-based random number generator.

When advertising in an unprovisioned state, the electronic lock controller 110 may be discovered by a mobile device 150 in the vicinity of the electronic lock controller 110. For example, the electronic lock controller 110 may advertise its unprovisioned state over Bluetooth, Bluetooth smart, Bluetooth Low Energy, Wi-Fi, ZigBee, Google Thread, Near-Field Communication, or any other communication protocol which the mobile device 150 is enabled to detect and interpret when in the vicinity of the electronic lock controller 110.

When the electronic lock controller 110 is discovered as being in the unprovisioned state, the electronic lock controller 110 communicates with the mobile device 150 to obtain the digital certificate 124. The process by which the electronic lock controller 110 obtains the digital certificate 124 is described in greater detail below with reference to FIG. 5. The electronic lock controller 110 also stores a copy of the public key 184 of the server 180 for handling requests to access the electronic lock controller 110.

Notably, however, the digital certificate 124 includes the public key 116 of the electronic lock controller 110, includes the hardware identifier 122 (having been verified as unique by the server 180), and is signed by a private key 182 of the server 180. The public key 116 of the electronic lock controller 110 was obtained from the electronic lock controller 110 by the mobile device 150. Similarly, the hardware identifier 122 was obtained by the mobile device 150 from the mark 118 containing the digitally signed lock information 120, for example, by scanning the mark 118. This information was transmitted to the server 180 for inclusion in the digital certificate 124. With the digital certificate 124 being provided by the server 180, signed by the private key 182 of the server 180, and including the hardware identifier 122 that is verified to be unique by the server 180, the electronic lock controller 110 has obtained a digital certificate 124 that verifies its authenticity. The digital certificate 124 is obtained by the electronic lock controller 110 executing self-provisioning instructions 112 and with the cooperation of the mobile device 150 and the server 180.

Once provisioned with the digital certificate 124, the electronic lock controller 110 may advertise itself as being in a provisioned state and capable to receive unlock requests, and may handle such requests as described in, for example, U.S. Pat. No. 10,008,061, which is incorporated herein by reference. In operation, the server 180 digitally signs lock access data, which includes a request to access the electronic lock controller 110 by a user of a mobile device 150, with its private key 182. The mobile device 150 obtains the digital certificate 124 from the electronic lock controller 110 when in vicinity of the electronic lock controller 110 and validates authenticity of the digital certificate 124 using a copy of the server's public key 184. Once validated, communications between the mobile device 150 and the electronic lock controller 110 can be secured on the basis of the digital certificate 124. The mobile device 150 can safely encrypt lock access data using the lock controller's public key 114 and transmit the encrypted lock access data to the electronic lock controller 110, which can use its private key 114 to decrypt the lock access data. The electronic lock controller 110 can validate the authenticity of the lock access data using the server's public key 184. If the lock-access data is successfully validated, the electronic lock controller 110 performs one or more operations defined by the lock access data, such as unlocking a lock to which it is operably connected.

It is advantageous that the mobile device 150 and the electronic lock controller 110 communicate using the digital certificate 124 uniquely assigned to the electronic lock controller 110. The server 180 signs both the lock access data and the lock controller's digital certificate 124, advantageously allowing the electronic lock controller 110 and the mobile device 150, respectively, to validate the authenticity of the lock access data and the lock controller's digital certificate 124. This allows the electronic lock controller 110 to detect forged lock access data and respond appropriately by, for example, not opening its physical lock, logging an unauthorized access attempt, issuing an alarm, or similar. In addition, the mobile device 150 can detect an impostor lock controller and respond appropriately by, for example, not transmitting the lock access data, notifying the server 180 of the location of the unauthorized lock controller, and similar.

Figure 2:
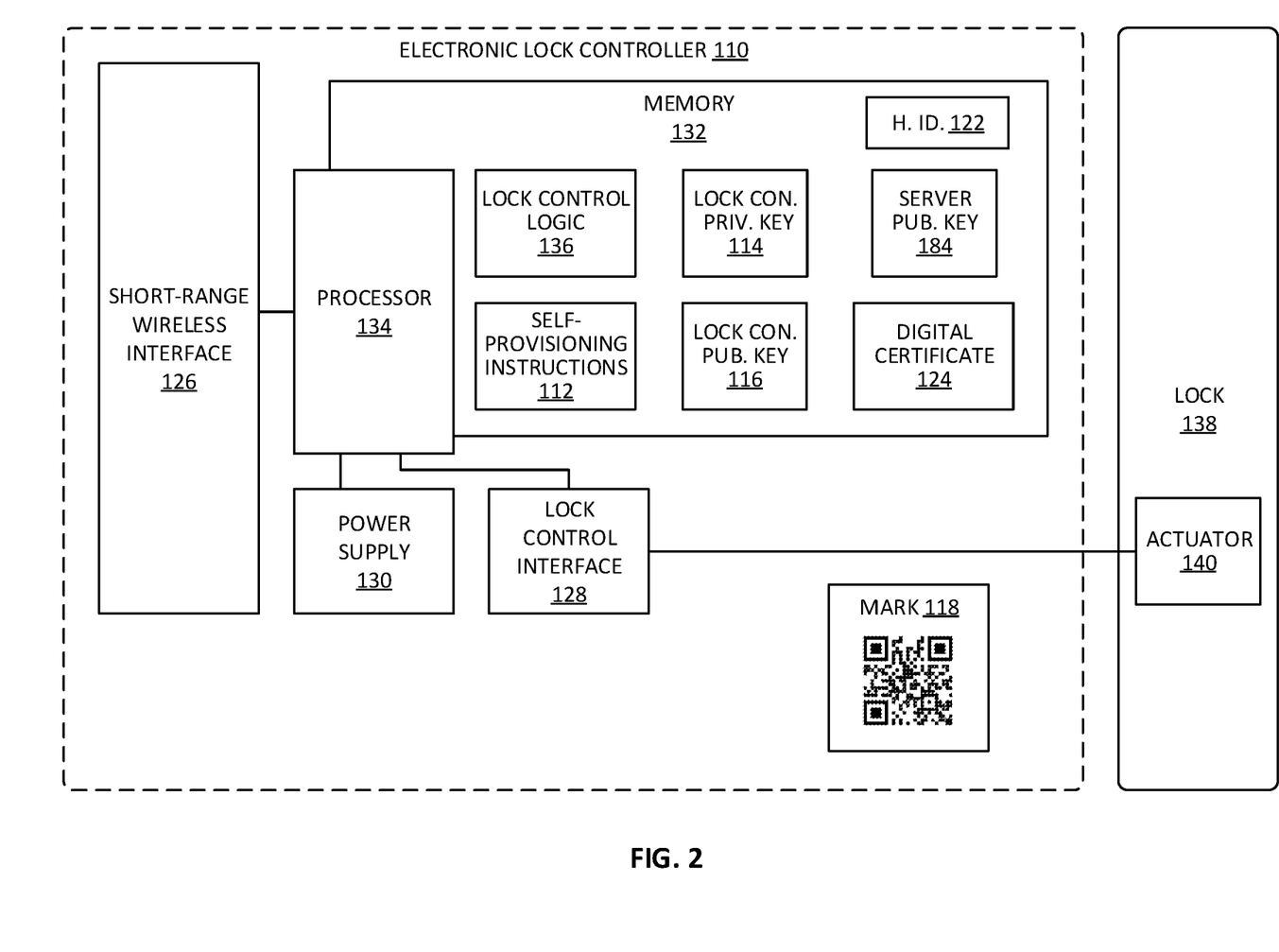
FIG. 2 a schematic diagram of an example electronic lock controller of the system of FIG. 1.

FIG. 2 a schematic diagram of the example electronic lock controller 110. The electronic lock controller 110 is one example of an electronic lock controller that can be used with the system 100.

The electronic lock controller 110 includes a short-range wireless interface 126, a lock control interface 128, a power supply 130, memory 132, and a processor 134. The short-range wireless interface 126 includes a short-range communications interface, such those discussed above (e.g., Bluetooth, BLE, etc.), configured for communication with mobile devices 150 in vicinity of the electronic lock controller 110. The memory 132 includes any combination of ROM, RAM, flash memory, magnetic storage, optical storage, and similar for storing instructions and data as discussed herein. The processor 134 includes one or more CPUs, microcontrollers, microprocessors, processing cores, field-programmable gate arrays FPGAs, and similar. All or some of the memory 132 may be integrated with the processor 134. The processor 134 and memory 132 cooperate to execute instructions to cause the electronic lock controller 110 to perform the functionality discussed herein, including self-provisioning instructions 112 and lock control logic 136.

The lock control interface 128 is configured to provide signals to the lock 138 and may also be configured to receive signals from the lock 138. The lock control interface 128 can include an I/O port/bus or similar. Examples of signals that can be sent to the lock 138 include an unlocking signal that unlocks the lock 138 and a locking signal that locks the lock 138. Examples of signals that can be received from the lock 138 include a status signal indicating whether the lock 138 is locked or unlocked. In this example, the lock 138 includes driving circuitry and an electrical actuator 140 such as motor, solenoid, or similar that converts electrical power into mechanical movement of the lock 138 according to signals received from the lock control interface 128. In other examples, the lock control interface 128 includes one or both of such driving circuitry and electrical actuator.

The power supply 130 is configured to provide power to the electronic lock controller 110. The power supply 130 may also be configured to provide power to the lock 138 if the lock does not have its own power supply. Examples of suitable power supplies 130 include batteries, wind generators, solar panels, a combination of such, and the like. Multiple power supplies 130 of the same or different types can be provided for redundancy.

The electronic lock controller 110 is configured to store a digital certificate 124 as discussed above with reference to FIG. 1. The electronic lock controller 110 is further configured to store the public key 184 of the server 180. The electronic lock controller 110 can further store its hardware identifier 122 once provisioned so that the electronic lock controller 110 can consider only lock-access data containing the identical hardware identifier 122 as valid.

The electronic lock controller 110 includes lock control logic 136 to transmit the public key of the digital certificate 124 to mobile devices 150 through the wireless interface 126, so that the mobile devices 150 may securely communicate with the electronic lock controller 110. The control logic 136 is further configured to decrypt encrypted lock access data contained in messages received from mobile devices 150 via the wireless interface 126. Decryption is performed using the private key of the digital certificate 124, so as to obtain decrypted lock access data. The control logic 136 is further configured to validate the authenticity of any received lock access data using the public key 184 of the server 180. The lock control logic 136 is also configured to control the control the lock control interface 128 to unlock the physical lock 138, as permitted by lock access data, so as to grant access to a physical resource.

The lock control logic 136 is further configured to record instances of access to the physical resource as log data, which may be encrypted using the public key 184 of the server 180 and transmitted to any mobile device 150 in the vicinity of the electronic lock controller 110 for transport back to the server 180.

As discussed above with reference to FIG. 1, the electronic lock controller 110 is marked with a mark 118 that contains digitally signed lock information 120. The mark 118 is shown by way of example as a QR code. The electronic lock controller 110 further stores its public key 116 and corresponding private key 116 as generated by the self-provisioning instructions 112.

The self-provisioning instructions 112 cause the electronic lock controller 110 to determining whether it is provisioned with its private key and corresponding public key, for example, when the electronic lock controller 110 is first booted up. Upon determining that the electronic lock controller is not provisioned with its private key and public key, such as, for example, when the electronic lock controller 110 has been booted up for the first time, the electronic lock controller 110 generates its private key 114 and public key 116 (e.g. using a hardware-based number generator), and begins to advertise itself that it is in an provisioned state to nearby mobile devices 150 through wireless interface 126.

In response to being discovered in the unprovisioned state by a mobile device 150 in the vicinity of the electronic lock controller 110, the self-provisioning instructions 112 cause the electronic lock controller 110 to communicate with the mobile device 150 through the wireless interface 126 to obtain the digital certificate 124. As discussed above, the digital certificate 124 includes the public key 116 of the electronic lock controller 110 and the hardware identifier 122, the hardware identifier having been obtained by the mobile device 150 from the mark 118 containing the digitally signed lock information 120 physically marked on the electronic lock controller 110 (e.g. by the mobile device 150 scanning the QR code), and is signed by the private key 182 of the server.

Once provisioned, the electronic lock controller 110 may receive lock access data from a mobile device 150 through the wireless interface 126 using the digital certificate 124 as a basis for encrypted communications between the electronic lock controller 110 and the mobile device 150. The lock access data may include a request to unlock the physical lock 138.

Figure 3:
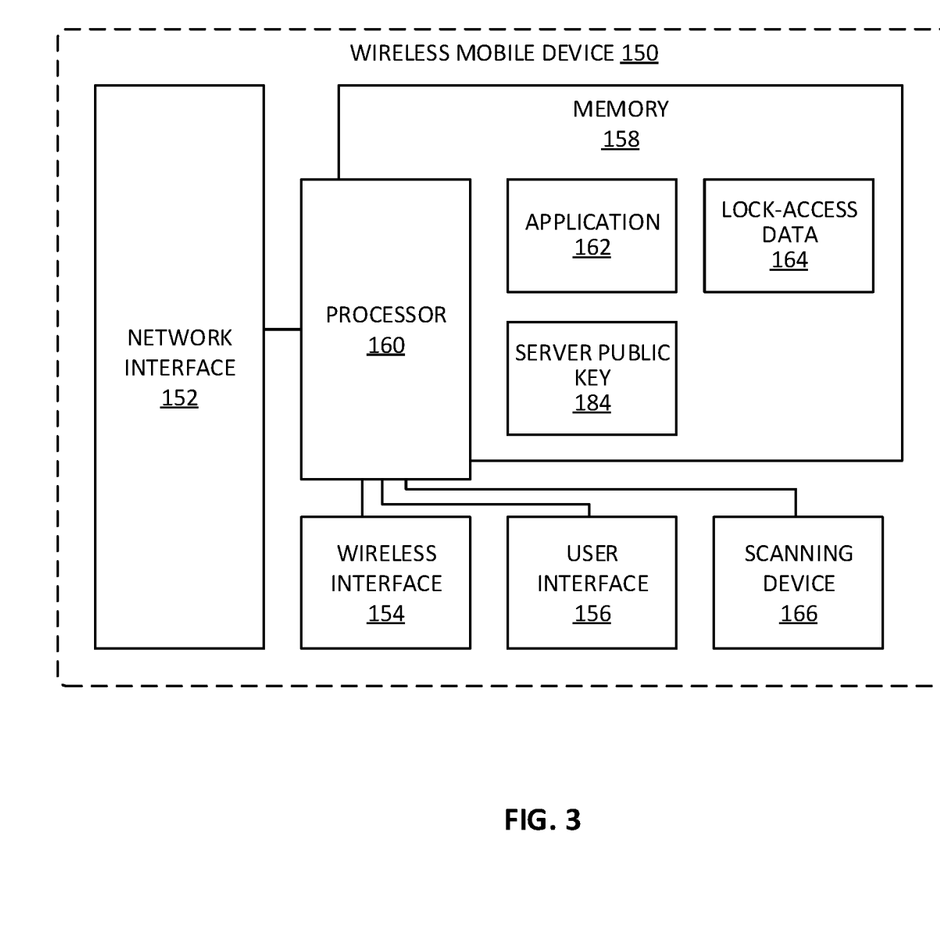
FIG. 3 is a schematic diagram of an example mobile device that facilitates access to the electronic lock controller of the system of FIG. 1.

FIG. 3 is a schematic diagram of the example mobile device 150. The mobile device 150 is one example of a mobile device that can be used with the system 100.

The mobile device 150 includes a network interface 152, a wireless interface 154, a user interface 156, memory 158, and a processor 160. The network interface 152 is configured for bidirectional data communications via the computer network 104. The network interface 152 includes a network adaptor and driver suitable for the type of network 104. The wireless interface 154 includes a short-range communications interface, such those discussed above (e.g., Bluetooth, BLE, etc.). The network interface 152 and the wireless interface 154 may be the same interface configured differently. The user interface 156 includes a display device, a touchscreen, a keyboard, a microphone, a speaker, or a combination of such. The memory 158 includes any combination of ROM, RAM, flash memory, magnetic storage, optical storage, and similar for storing instructions and data as discussed herein. The processor 160 includes one or more CPUs, microcontrollers, microprocessors, processing cores, field-programmable gate arrays FPGAs, and similar. All or some of the memory 158 may be integrated with the processor 160. The processor 160 and memory 158 cooperate to execute instructions to cause the wireless mobile device 16 to perform the functionality discussed herein, including the facilitation of the electronic lock controller 110 obtaining the digital certificate 124, as is described in greater detail with reference to FIG. 5.

The mobile device 150 is configured to store the server public key 184 and further store any lock access data 164 to be used to gain access to physical resources. The mobile device 150 is configured to act as a data proxy between the server 180 and the electronic lock controller 110. Hence, the mobile device 150 may be required to temporarily store data at times when long-range data communications are not available through the network interface 152. For example, the electronic lock controller 110 may be located outside of cellular coverage and the mobile device 150 holds log data destined for the server 180 until the mobile device 150 returns to coverage.

The mobile device 150 further includes an application 162 to act as a data proxy between the server 180 and the electronic lock controller 110 as discussed in greater detail below with reference to FIG. 5. The application 162 can be configured to facilitate such transport of data irrespective of whether a particular electronic lock controller 110 is to be accessed by the mobile device 150. The application 162 is further configured to use the digital certificate 124 of the electronic lock controller 110 as a basis for encrypted communications between the mobile device 150 and the electronic lock controller 110, and to use the server's public key 184 to validate authenticity of any certificate provided by the electronic lock controller 110. The application 162 is further to handle discovery of the electronic lock controller 110, including discovery of the electronic lock controller 110 in the unprovisioned state, as well as setup and expiry of short-range communication sessions with electronic lock controllers 110, according to the particular communications scheme used (e.g., Bluetooth, BLE, etc.).

The application 162 may further be configured to provide human-intelligible descriptions for any stored lock access data 164, any stored server public keys 184, to manage connections and account credentials with the server 180 and to receive lock access data 164 from the server 180.

The mobile device 150 further includes a scanning device 166 capable of scanning the mark 118 to obtain the digitally signed lock information 120. For example, in the case where the mark 118 comprises a QR code, the scanning device 166 may comprise a camera to capture an image of the QR code. The application 162 may further be configured to prompt the user of the mobile device 150 to obtain the digitally signed lock information 120, such as by using the scanning device 166.

Thus, the application 162 is configured to cause the mobile device 150 to discover an electronic lock controller 110 advertising itself in unprovisioned state, and to obtain the public key 116 of the electronic lock controller 110 and the digitally signed lock information 120 from the mark 118, and to communicate with the electronic lock controller 110 to provide the electronic lock controller 110 with the digital certificate 124.

Figure 4:
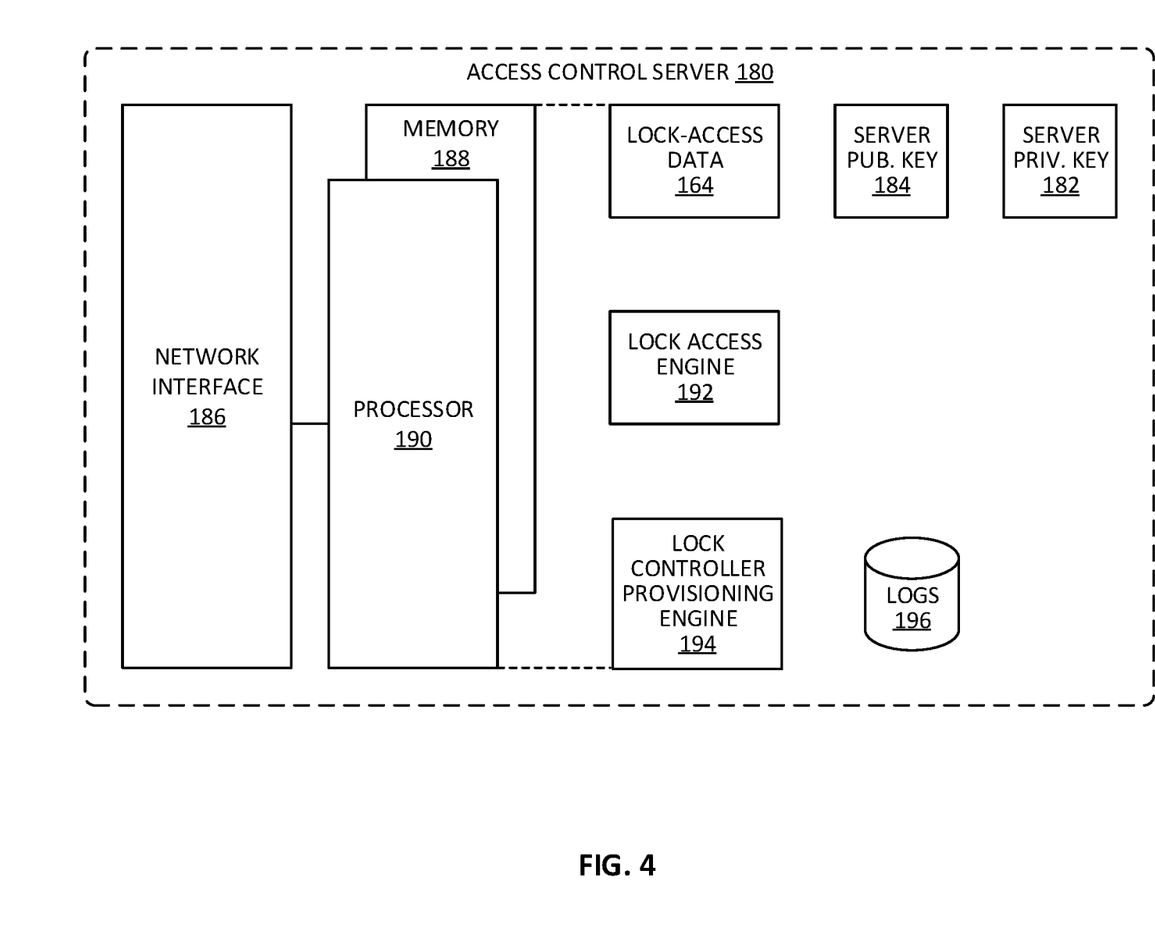
FIG. 4 is a schematic diagram of an example server that facilitates access to the electronic lock controller of the system of FIG. 1.

FIG. 4 is a schematic diagram of the example access control server 180. The server 180 is one example of a server that can be used with the system 100. The term server used herein refers to a single server or multiple cooperating servers.

The server 180 includes a network interface 186, memory 188, and a processor 190. The network interface 186 is configured for bidirectional data communications through the computer network 104. The network interface 186 includes a network adaptor and driver suitable for the type of network 104. The memory 188 includes any combination of read-only memory (ROM), random-access memory (RAM), flash memory, magnetic storage, optical storage, and similar for storing instructions and data as discussed herein. The processor 190 includes one or more central-processing units (CPU), microcontrollers, microprocessors, processing cores, field-programmable gate arrays (FPGA), and similar. All or some of the memory 188 may be integrated with the processor 190. The processor 190 and memory 188 cooperate to execute instructions to cause the server 180 to perform the functionality discussed herein, including generating the digital certificate 124 for the electronic lock controller 110.

The server 180 stores the server's private and public keys 182, 184. The server 180 may further store account data including user permissions to access electronic lock controllers.

The server 180 further includes a lock access engine 192 that is configured to generate lock access data 164 based on lock data and user account data to allow access to specific physical resources by specific users.

The server 180 further includes a lock controller provisioning engine 194 that controls the generation and distribution of digital certificates 124 that verify authenticity of electronic lock controllers 110. The server 180 further stores logs 196 of hardware identifiers 122 assigned to electronic lock controllers 110 and digital certificates 124 distributed to electronic lock controllers 110. The process by which the server 180 generates and distributes digital certificates 124 is described in greater detail below with reference to FIG. 5.

Figure 5:
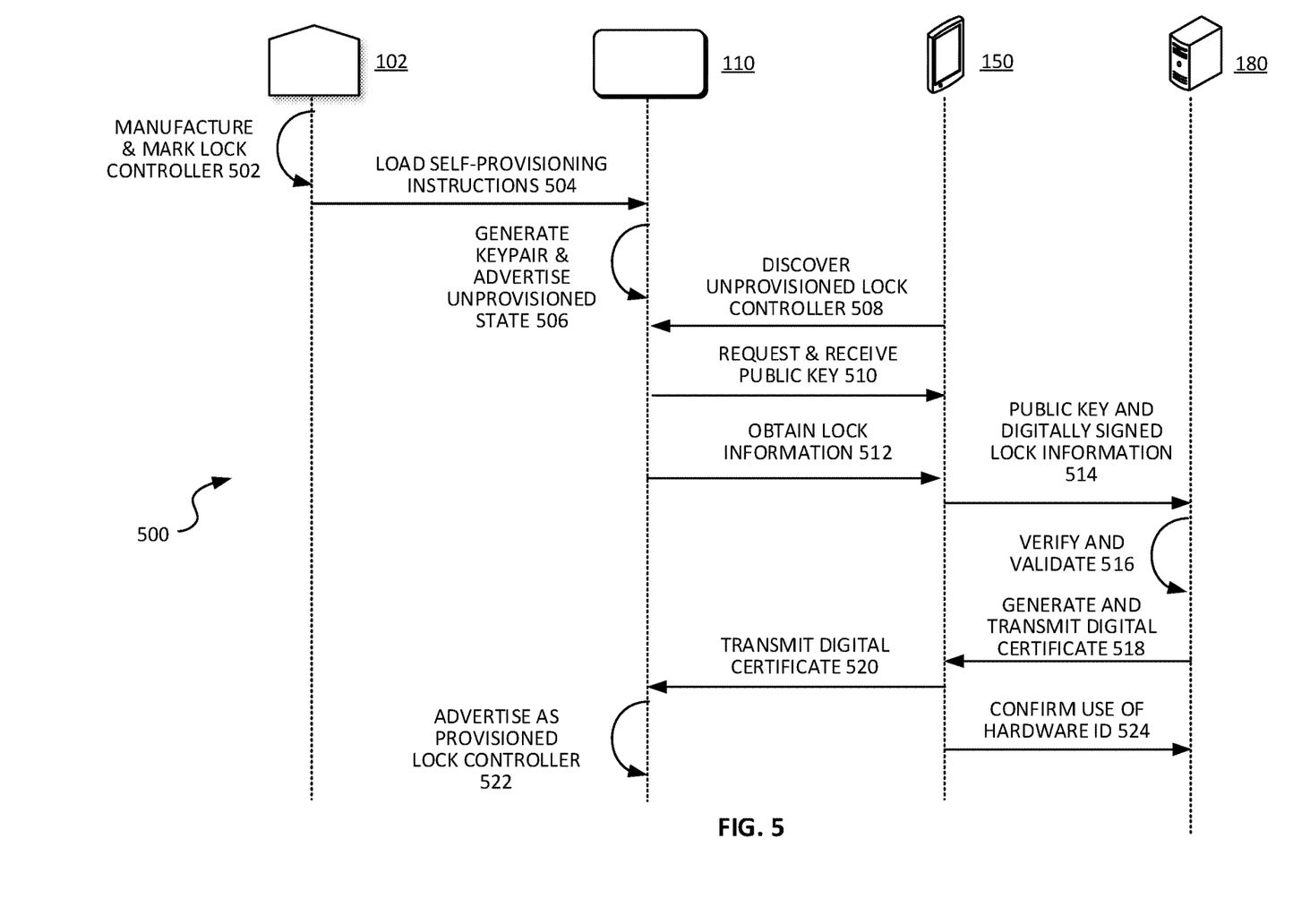
FIG. 5 is a flow diagram of a process for securely provisioning the electronic lock controller of FIG. 1 with the digital certificate that verifies its authenticity.

FIG. 5 is a flow diagram of an example process 500 for securely provisioning the electronic lock controller 110 with the digital certificate 124 that verifies its authenticity. In the process 500, the manufacturing facility 102 manufactures the electronic lock controller 110, and the electronic lock controller 110 executes its self-provisioning instructions 112 and cooperates with the mobile device 150 and server 180 to obtain its digital certificate 124.

At step 502, the manufacturing facility 102 manufactures the electronic lock controller, and the manufacturing facility 102, or a downstream actor, physically marks the electronic lock controller 110 with a mark 118 that contains digitally signed lock information 120. The digitally signed lock information 120 includes a hardware identifier 122, and is digitally signed by the private key 182 of the server 180.

At step 504, the manufacturing facility 102 or a downstream actor loads the electronic lock controller 110 with self-provisioning instructions 112.

At step 506, the electronic lock controller 110 determines that it is in an unprovisioned state and lacks a private/public keypair, and consequently generates its own private key 114 and corresponding public key 116, and advertises itself as being in an unprovisioned state.

At step 508, the mobile device 150 discovers the electronic lock controller 110 in the unprovisioned state.

At step 510, the mobile device 150 transmits a request to the electronic lock controller 110 for its public key 116. The electronic lock controller 110 receives this request, and transmits its public key 116 to the mobile device 150. The mobile device 150 receives the public key 116 from the electronic lock controller 110.

At step 512, the mobile device 150 obtains the digitally signed lock information 120 marked on the electronic lock controller 110.

At step 514, the mobile device 150 transmits the public key 116 of the electronic lock controller 110 and transmits the digitally signed lock information 120 to the server 180. The server 180 receives the public key 116 and the digitally signed lock information 120.

At step 516, the server 180 determines whether the hardware identifier 122 contained in the digitally signed lock information 120 has been previously assigned. The server 180 may make this determination with reference to logs 196. Further, the server 180 validates the digitally signed lock information 120 using its public key 184.

At step 518, if the server 180 determines that the hardware identifier 122 has not been previously assigned and that the digitally signed lock information 120 is validated, the server 180 generates the digital certificate 124 and transmits the digital certificate 124 to the mobile device 150. The digital certificate 124 includes the public key 116 of the electronic lock controller 110 and the hardware identifier 122 and is signed by the private key 182 of the server 180. The mobile device 150 receives the digital certificate 124. The server 180 further logs the hardware identifier 122 as being assigned to the electronic lock controller 110.

Alternatively, if the server 180 determines that the hardware identifier 122 has been previously assigned, the server 180 logs an attempt to re-assign the hardware identifier 122. In some examples, it may be intended that the hardware identifier 122 be assigned to multiple electronic lock controllers 110. In such examples, the hardware identifier 122 may be flagged as being permitted to be assigned to more than one electronic lock controller 110, for example, because a previous electronic lock controller 110 is to be decommissioned. Further, in such examples, upon determining that the hardware identifier 122 is flagged as being permitted to be assigned to more than one electronic lock controller 110, the server 180 proceeds to generate an appropriate digital certificate 124, transmits the digital certificate to the mobile device 150, and logs the assignment of the hardware identifier 122 to the electronic lock controller 110.

At step 520, the mobile device 150 transmits the digital certificate 124 to the electronic lock controller 110. The electronic lock controller 110 receives the digital certificate 124.

At step 522, having received the digital certificate 124, the electronic lock controller 110 advertises itself as being provisioned with its digital certificate 124 and being identified by the hardware identifier 122.

At step 524, the mobile device 150 confirms that the electronic lock controller 110 is advertising itself as being identified by the hardware identifier 122. The electronic lock controller 110 is then capable of receiving lock access data from the mobile device 150 including requests to unlock its physical lock 138, using the digital certificate 124 as a basis for encrypted communications between the mobile device 150 and the electronic lock controller 110.

Figure 6:
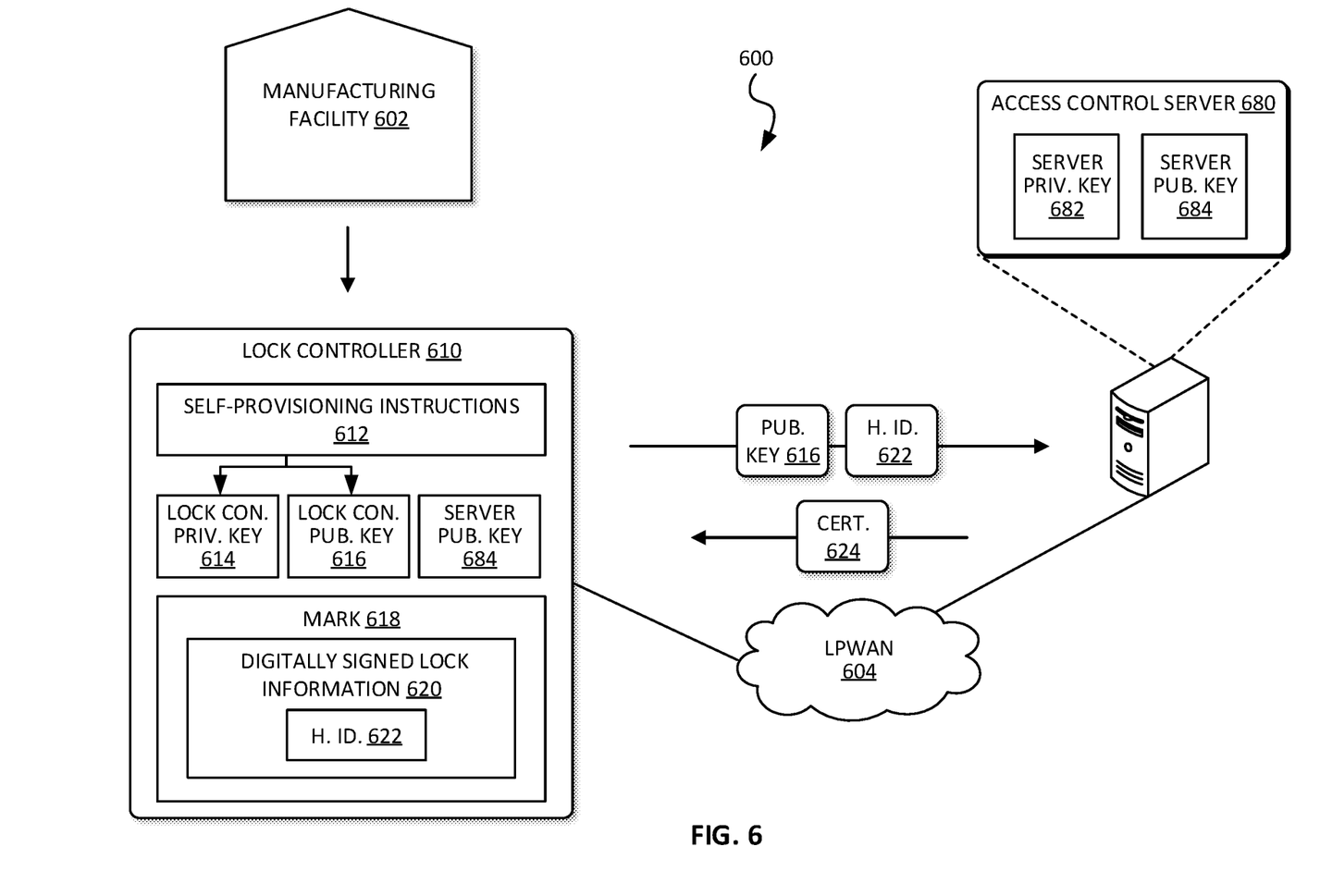
FIG. 6 is a schematic diagram of another example system with an electronic lock controller that obtains a digital certificate that verifies authenticity of the electronic lock controller.

FIG. 6 schematic diagram of another example system 600 with an electronic lock controller 610 that obtains a digital certificate 612 that verifies authenticity of the electronic lock controller 610. The system 600 is similar to the system 100 of FIG. 1, with like elements numbered in the "600" series rather than the "100" series, and therefore includes a manufacturing facility 602, an electronic lock controller 610 to obtain a digital certificate 624, wherein the electronic lock controller 610 stores self-provisioning instructions 612, private key 614, public key 616, server public key 684, and is marked with a mark 618 containing digitally signed lock information 620 containing a hardware identifier 622, and the system 600 further includes an access control server 680 that stores private key 682 and public key 684 and generates the digital certificate 624 in communication with the electronic lock controller 610.

However, in contrast to the system 100 of FIG. 1, the system 600 of FIG. 6 does not include a mobile device to facilitate communications with the server 680. Rather, the electronic lock controller 610 is equipped for direct long-range communications with the server 180 through a low-power wide-area network (LPWAN) 604, such as a cellular network, radio, or other low power communication protocol, to obtain the digital certificate 624. In such examples, the electronic lock controller 610 may be similar to the electronic lock controller 110 described in FIG. 2, with a long-range wireless interface configured for bi-directional communication over the LPWAN 604, and similarly, the access control server 680 may be similar to the server 180 described in FIG. 4, similarly with a long-range wireless interface configured for bi-directional communication over the LPWAN 604.

The process 500 of FIG. 5 may be adapted for the system 600 by exclusion of the mobile device 150 in favor of direct communication between the electronic lock controller 610 and server 680. For example, at step 508, the server 680 may discover the electronic lock controller 610 in the unprovisioned state. Further, at step 510, the server 680 may request and receive the public key 616 of the electronic lock controller 610. Further, at step 512, the server 680 may obtain the digitally signed lock information 620. In some examples, the digitally signed lock information 620 is stored at the electronic lock controller 610, and thus the server 680 may obtain the digitally signed lock information 620 directly from the electronic lock controller 610. In other examples, the electronic lock controller 610 may include a scanning device, such as a camera or other scanning device, to capture the digitally signed lock information 620 from a marking placed 618 on the electronic lock controller 610 for transmission to the server 680. In still other examples, a mobile device may be used to obtain the digitally signed lock information 620 (e.g. from a marking 618) for transmission to the server 680, while the electronic lock controller 610 provides its public key 616 to the server 680 directly. The transmission step 514 may be omitted. Further, at step 518, the digital certificate 624 may be transmitted directly to the electronic lock controller 610. The transmission step 520 may be omitted. At step 524, the electronic lock controller 610 may confirm use of the hardware identifier 622 with the server 680 directly.

Thus, an electronic lock controller can be prepared to obtain a digital certificate that verities its authenticity without the involvement of its manufacturing facility. The electronic lock controller is marked with digitally signed lock information containing a hardware identifier and loaded with self-provisioning instructions that enable the electronic lock controller to obtain, through a nearby mobile device and a remote trusted server, or directly with the remote trusted server, a unique digital certificate which matches its hardware identifier. Once provisioned with its digital certificate, the electronic lock controller can be trusted to be properly provisioned by the server.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method for preparing an electronic lock controller to obtain a digital certificate that verifies authenticity of the electronic lock controller, the method comprising:
   physically marking an electronic lock controller with a mark containing digitally signed lock information, the digitally signed lock information including a hardware identifier, the digitally signed lock information having been digitally signed at a server using a private key of the server; and
   loading the electronic lock controller with non-transitory machine-readable instructions to cause a processor of the electronic lock controller to:
      generate a private key of the electronic lock controller and a corresponding public key of the electronic lock controller;
      advertise itself as being in an unprovisioned state capable of being discovered by a mobile device in a vicinity of the electronic lock controller; and
      in response to being discovered in the unprovisioned state by the mobile device, communicate with the mobile device to obtain a digital certificate, the digital certificate including the public key of the electronic lock controller and the hardware identifier, the hardware identifier having been obtained by the mobile device from the mark containing the digitally signed lock information, the digital certificate having been signed by a private key of the server.

2. The method of claim 1, wherein the non-transitory machine-readable instructions are to cause the processor of the electronic lock controller to communicate with the mobile device to obtain the digital certificate by:
   receiving a request for the public key of the electronic lock controller from the mobile device;

transmitting the public key of the electronic lock controller to the mobile device; and receiving the digital certificate from the mobile device, the digital certificate generated at the server upon validation of the digitally signed lock information and verification that the hardware identifier has not previously been assigned, the validation of the digitally signed lock information performed using a public key of the server, the digitally signed lock information having been provided to the server by the mobile device.

3. The method of claim 1, wherein the electronic lock controller is operably connectable to an electronic actuator of a physical lock that restricts access to a physical resource.

4. The method of claim 1, wherein the digitally signed lock information is encoded into a QR code, and wherein the hardware identifier is obtained by the mobile device by the mobile device scanning the QR code.

5. The method of claim 1, wherein the mark comprises a sticker displaying the digitally signed lock information.

6. The method of claim 1, wherein the digitally signed lock information comprises a uniform resource locator (URL) with the hardware identifier embedded in the URL.

7. The method of claim 1, wherein the private key of the electronic lock controller and the public key of the electronic lock controller are generated using a hardware-based random number generator.

8. The method of claim 1, with non-transitory machine-readable instructions to cause a processor of the electronic lock controller to, upon obtaining the digital certificate, advertise the electronic lock controller as being in a provisioned state and capable to receive unlock requests.

9. A method for generating a digital certificate that verifies authenticity of an electronic lock controller, the method comprising:

receiving a public key of an electronic lock controller from a mobile device;

receiving digitally signed lock information from the mobile device, the digitally signed lock information having been physically marked on the electronic lock controller, the digitally signed lock information including a hardware identifier, the digitally signed lock information having been digitally signed at a server using a private key of the server;

determining whether the hardware identifier has been previously assigned;

validating the digitally signed lock information using a public key of the server;

upon determining that the hardware identifier has not previously been assigned, and upon validation of the digitally signed lock information, generating a digital certificate using the private key of the server, the digital certificate including the public key of the electronic lock controller and the hardware identifier as included in the digitally signed lock information, the digital certificate signed by the private key of the server;

logging the hardware identifier as having been assigned to the electronic lock controller; and transmitting the digital certificate to the mobile device for transmission to the electronic lock controller.

10. The method of claim 9, further comprising, upon determining that the hardware identifier has been previously assigned, logging an attempt to re-assign the hardware identifier.

11. The method of claim 9, further comprising:

upon determining that the hardware identifier has been previously assigned, determining whether the hardware identifier is flagged as permitted to be assigned to more than one electronic lock controller; and upon determining that the hardware identifier is flagged as permitted to be assigned to more than one electronic lock controller:

generating a digital certificate using the private key of the server, the digital certificate including the public key of the electronic lock controller and the hardware identifier as included in the digitally signed lock information, the digital certificate signed by the private key of the server;

logging the hardware identifier as having been assigned to the electronic lock controller; and transmitting the digital certificate to the mobile device for transmission to the electronic lock controller.

12. The method of claim 11, further comprising:

flagging the hardware identifier as permitted to be assigned to more than one electronic lock controller because a previous electronic lock controller is to be decommissioned.

13. A method for obtaining for an electronic lock controller a digital certificate that verifies authenticity of the electronic lock controller, the method comprising:

determining whether an electronic lock controller is provisioned with a private key of the electronic lock controller and a corresponding public key of the electronic lock controller;

upon determining that the electronic lock controller is not provisioned with the private key of the electronic lock controller or the corresponding public key of the electronic lock controller:

generating a private key of the electronic lock controller and a corresponding public key of the electronic lock controller; and advertising that the electronic lock controller is in an unprovisioned state discoverable by a mobile device in a vicinity in the electronic lock controller; and in response to being discovered in the unprovisioned state by the mobile device, communicating with the mobile device to obtain a digital certificate, the digital certificate including the public key of the electronic lock controller and a hardware identifier, the hardware identifier having been obtained by the mobile device from a mark containing digitally signed lock information physically marked on the electronic lock controller, the digital certificate having been signed by a private key of a server.

14. The method of claim 13, further comprising:

receiving lock access data from the mobile device using the digital certificate as a basis for encrypted communications between the electronic lock controller and the mobile device, the lock access data including a request to unlock a physical lock coupled to the electronic lock controller, the lock access data being validated at the electronic lock controller using the public key of the server.

15. The method of claim 13, wherein communicating with the mobile device to obtain the digital certificate comprises:

the electronic lock controller receiving a request for the public key of the electronic lock controller from the mobile device;

the electronic lock controller transmitting the public key of the electronic lock controller to the mobile device; and the electronic lock controller receiving the digital certificate from the mobile device, the digital certificate generated at the server upon validation of the digitally signed lock information and verification that the hardware identifier has not previously been assigned, the validation of the digitally signed lock information performed using a public key of the server, the digitally signed lock information having been provided to the server by the mobile device.

16. The method of claim 13, wherein the digitally signed lock information is encoded into a QR code scannable by the mobile device to obtain the digitally signed lock information.

17. The method of claim 13, wherein the private key of the electronic lock controller and the public key of the electronic lock controller are generated using a hardware-based random number generator.

18. A method for facilitating an electronic lock controller to obtain digital certificate that verifies authenticity of the electronic lock controller, the method comprising:
 discovering an electronic lock controller advertising itself in unprovisioned state, the electronic lock controller in a vicinity of a mobile device, the electronic lock controller having a public key and a corresponding private key generated by the electronic lock controller, the electronic lock controller physically marked with a mark containing digitally signed lock information, the digitally signed lock information including a hardware identifier for the electronic lock controller, the digitally signed lock information having been digitally signed at a server using a private key of the server;
 obtaining the public key of the electronic lock controller from the electronic lock controller;
 obtaining the digitally signed lock information from the mark, the digitally signed lock information including a hardware identifier; and
 communicating with the electronic lock controller to provide the electronic lock controller with a digital certificate, the digital certificate including the public key of the electronic lock controller and the hardware identifier, the digital certificate having been signed by a private key of a server.

19. The method of claim 18, wherein communicating with the electronic lock controller to provide the electronic lock controller with the digital certificate comprises:
 the mobile device requesting a public key of the electronic lock controller from the electronic lock controller;
 the mobile device receiving the public key of the electronic lock controller from the electronic lock controller;
 the mobile device obtaining the digitally signed lock information from the electronic lock controller;
 the mobile device transmitting the public key of the electronic lock controller and the digitally signed lock information to the server;
 the mobile device receiving the digital certificate from the server; and
 the mobile device transmitting the digital certificate to the electronic lock controller.

20. The method of claim 18, wherein the digitally signed lock information is encoded into a QR code, and wherein obtaining the digitally signed lock information from the electronic lock controller comprises the mobile device scanning the QR code.

* * * * *